United States Patent Office 3,396,607
Patented Aug. 13, 1968

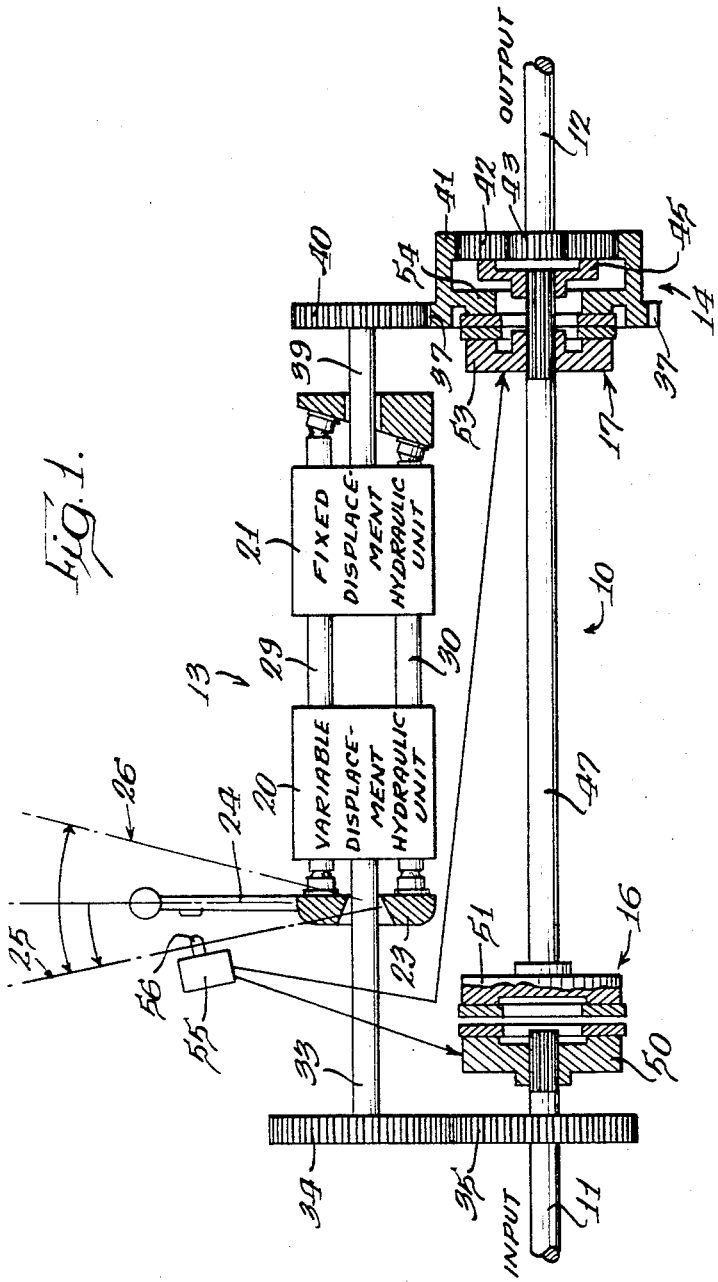

3,396,607
HYDROSTATIC TRANSMISSION
William A. Ross, Rockford, Ill., assignor to Sundstrand Corporation, a corporation of Delaware
Filed Feb. 21, 1966, Ser. No. 529,007
6 Claims. (Cl. 74—687)

ABSTRACT OF THE DISCLOSURE

A hydrostatic transmission including a hydraulic drive and differential gearing consisting of intermeshing control, first and second gears with the control gear drivingly connected to the hydraulic drive, the first gear selectively connectible to the transmission input shaft, and the second gear continuously driving the transmission output shaft, and a control effecting a transmission of all power hydraulically in a low speed range by engaging a first clutch which locks the differential gears together for rotation as a unit, the control effecting a split transmission of power in an upper speed range by engaging a second clutch which drivingly connects the input shaft to the first gear and disengaging the first clutch when the first gear rotates at substantially the same speed as the input shaft.

This invention relates generally to hydrostatic transmissions and more particularly to a variable speed hydrostatic transmission having plural power paths between an input shaft and an output shaft, for use in propelling any vehicle ranging from heavy-tracked working types to high-speed highway types.

In the past, a basic hydrostatic transmission for vehicles has contemplated an infinitely variable speed system which attains speed ratios by relative adjustment of pump and motor displacements, with all power being transmitted hydraulically. This type of transmission, however, may be unsuitable in applications which require small, light and efficient transmissions. To achieve more compact and efficient transmissions, the basic systems may be modified to include provision for shifting gear ratios, or they may be modified to include plural hydraulic units with provision for selectively declutching one or more units. While the systems thus modified do provide some advantages such as reduction in hydraulic unit size or increase in efficiency, there are also often attendant disadvantages such as a need for large clutches or an increase in complexity.

In an alternative approach to modification of basic systems to provide more compact and efficient transmissions, it has been advocated that a differential transmission providing a split drive path employing both mechanical and hydraulic transfer of torque from the input shaft to the output shaft with a mechanical differential is an advantageous improvement. In fact, while differential transmissions of this type do have a place in the operating range where the hydraulic horsepower transfer is low relative to total transmitted power, if the transmission must be operated to zero output speed, it will not ordinarily permit reduction in the size of hydraulic units required.

The present invention obviates many of the problems referred to above by providing a hydrostatic transmission which embodies both a mechanical differential and shiftable clutches in a novel arrangement. The improved transmission minimizes hydraulic unit duty and clutch size thereby producing a much smaller, lighter and more efficient transmission. To this end, the present transmission employs a purely hydrostatic drive during the low output speed ranges and a combined hydrostatic and mechanical differential drive in the higher speed ranges, with the shift between the two ranges occurring at a time when nominally no speed changes occur in the transmission at the instant of shift and the clutch components are inherently rotating synchronously.

It is, therefore, a primary object of the present invention to provide a new and improved hydrostatic transmission which minimizes the required hydraulic unit and clutch sizes and results in a smaller, lighter, and more efficient transmission.

Another object of the present invention is to provide a new and improved hydrostatic transmission having a lower and an upper speed range in which power is transferred in the low speed range solely through the hydraulic portion of the drive, and in the upper speed range through split paths combined by a differential.

A further object of the present invention is to provide a new and improved hydrostatic transmission of the type described above in which shifting occurs at a time when the shiftable elements are inherently rotating substantially synchronously (except for limited insignificant differences due to volumetric inefficiencies in the hydraulic units), so that shifting occurs in a smooth, simple manner.

An additional object of the present invention is to provide a new and improved transmission of the character mentioned in which one of the hydraulic units traverses its speed range three times, from neutral to maximum in one direction, from said maximum back to neutral, and from neutral to maximum in the opposite direction, while the output shaft accelerates from zero to its maximum speed, thus reducing the size of the hydraulic unit necessary. This characteristic in addition to transfer of power through split drive paths results in a small, light and efficient transmission.

It is a more specific object of the present invention to provide a hydrostatic transmission having selectively operable power paths respectively in a low speed range and a high speed range with shifting between the speed ranges being effected by clutch means in which the clutching elements are inherently synchronous at a predetermined displacement of one of the hydraulic units in the transmission, including an input shaft which is connectible to the prime mover of the associated vehicle, an output shaft connectible to the propelling means such as wheels, a hydraulic transmission including a variable displacement hydraulic unit connected with the input shaft and a second hydraulic unit which may be a fixed displacement unit connected to drive the output shaft directly in the low speed range, a gear differential connected to the output shaft and selectively connectible mechanically with the input shaft so that drive in the upper speed range is effected by providing plural power paths, the displacement of the one unit being variable on both sides of neutral with the other unit being connected to a control gear in the differential so that it may reversely rotate the same to effect a wide speed range and permit the units each to act as both a pump and a motor during various parts of the speed range; the differential and the displacement of the units being selected so that at the top of the lower speed range, the clutch elements between the differential and the input shaft rotate inherently synchronously to provide a smooth and simple shift; and further including a second clutch which locks up the differential during the straight hydraulic mode in the low speed range, and a control system responsive to the displacement of the one unit to effect smooth operation of the clutches at the top of the low speed range.

Further objects and advantages will become apparent from the following detailed description taken in connection with the accompanying drawings, in which:

FIG. 1 is a schematic illustration of the present transmission;

FIG. 2 is a simplified control diagram for use in the present transmission to effect shifting; and FIG. 3 is a graph showing how the speed of the fixed hydraulic unit varies as the output shaft speed varies from zero to a maximum for a given input speed.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring to FIG. 1, a hydraulic-differential transmission is shown generally designated by the numeral 10, incorporating the principles of the present invention. It should be understood, however, that the illustration in FIG. 1 is merely a schematic form for the sake of clarity, and that in actual practice the transmission would take a much more compact form. This transmission is particularly suitable for vehicles that require very small, light and efficient transmissions.

An input shaft 11 is connectible with the prime mover of the vehicle while the output shaft 12 is connectible through suitable gearing arrangements with the driving means, such as wheels of the vehicle.

Basically, the transmission 10 includes a hydraulic transmission 13, a differential 14, and clutches 16 and 17 which provide selectively operable power paths between the input shaft 11 and the output shaft 12.

The hydraulic transmission component 13 includes a variable displacement hydraulic unit 20 and a fixed displacement hydraulic unit 21. Each of the hydraulic units may take the form of multiple axial piston hydraulic devices in which the pistons are reciprocated by a cam or a thrust member. In the variable displacement hydraulic unit 20, a pivotal swashplate 23 is adjustable for the purpose of varying the displacement of the unit by means of a suitable control handle 24 shown in FIG. 1 in its neutral or no stroke position. The cam or swashplate 23 and control handle 24 are movable from the neutral position to a first maximum stroke position 25 on one side of neutral, and a second maximum stroke position 26 on the other side of neutral. Thus, reversible flow relative to hydraulic unit 20 is provided by movement of the control handle 24 on either side of neutral so that flow conduits 29 and 30, interconnecting the hydraulic units in conventional closed circuit fashion, may be reversed as high and low pressure conduits. In this manner the direction and speed of rotation of the fixed displacement unit 21 may be controlled.

The variable displacement unit 20 is connected to rotate with the input shaft through a shaft 33 and gears 34 and 35. The hydraulic unit 21 is connected to rotate with a control gear 37 by shaft 39 and gear 40. As will appear hereinafter more clearly, each of the hydraulic units 20 and 21 is adapted to operate both as a pump or as a motor during different portions of the speed range of the transmission 10. In the low speed range of the transmission all of the power transferred from input shaft 11 to output shaft 12 is delivered through gears 35 and 34, the hydraulic transmission 13, gear 40 and control gear 37 to the output shaft 12.

The differential 14 is provided for effecting a split power path in the upper speed range of the present transmission. It includes a ring gear 41 formed integrally with gear 37, planet pinions 42 and a sun gear 43 drivingly connected to the output shaft 12. The planetary gears 42 are rotatably mounted on a planet carrier 45 splined to a coaxial power shaft 47. The displacement of the units 20 and 21 are matched, and the gearing 34 and 35, 40 and 37 is selected, so that when swashplate 23 is in the first maximum displacement position 25 and with clutch 17 engaged, the hydraulic transmission 13 will rotate selective power shaft 47 in the same direction and at the same speed as input shaft 11. Further, with clutch 17 disengaged and clutch 16 engaged during the forward operation of the transmission, ring gear 41 will rotate either in the same direction as shafts 11 and 12 to subtract speed from the differential, or in the opposite direction from shafts 11 and 12 to add speed to the differential in conventional fashion. Thus, ring gear 41 controls the speed ratio between shafts 12 and 47 in the upper speed range of the transmission as will appear below.

Clutches 16 and 17 serve to shift the transmission from the straight hydraulic low speed range to a split path differential high speed range. Clutch 16 includes a first clutching member 50 splined to the input shaft 11 and a second clutching member 51 splined to power shaft 47 and selectively engageable by the first clutching member 50. Clutch 17 when engaged serves to lock the differential 14 so that gear 40 may directly drive the output shaft 12 in the lower speed range. It includes a first clutching member 53 splined to power shaft 47 and selectively engageable with a second clutching member 54 formed on the control gear 37. Thus, when clutch 17 is engaged, the differential 14 is locked by preventing relative rotation between the ring gear 41 and the planetary gear carrier 45 which is splined to shaft 47. When clutch 17 is disengaged, the differential unlocks and the speed of output shaft 12 may vary with respect to power shaft 47.

A control system shown in part in FIG. 2 is provided for shifting the transmission from a low speed operational mode to the high speed operational mode. This circuit includes a switch 55 positioned so that its plunger 56 is actuated by the control handle 24 as the handle reaches the first maximum displacement position 25. Switch 55 may be a single pole double throw switch. With a control of the type illustrated, the switch preferably has a short travel and a relatively stiff spring so that the operator may "feel" the shift.

Solenoids 58 and 59 are provided for actuating and engaging clutches 16 and 17, respectively. When in the low speed range, switch 55 maintains solenoid 59 energized and solenoid 58 deenergized so that clutch 16 is disengaged and clutch 17 is engaged. When plunger 56 is initially depressed by control handle 24, solenoid 58 becomes energized and solenoid 59 deenergized, so that clutch 16 engages and clutch 17 disengages. Switch 55 is constructed so that when it is depressed the second time by the control handle, solenoid 59 will again be energized and solenoid 58 deenergized, engaging clutch 17 and disengaging clutch 16.

It should be understood that switch 55 is illustrated only diagrammatically and may be of a conventional commercially available type adapted upon depression and release of the button 56 to assume one condition and retain it, and upon a successive depression and release of button 56 to assume the other condition and retain it.

While the structural configuration of the present transmission is described above, the advantages and characteristics of the present transmission will be more fully appreciated in the following description of operation. With the input shaft 11 rotating at its rated speed by the prime mover, and with the control handle 24 in its neutral position, the vehicle will remain at rest. Solenoid 58 is deenergized and solenoid 59 is energized so that clutch 16 is disengaged separating the driving connection between input shaft 11 and power shaft 47, and clutch 17 is engaged locking the differential 14 so that gear 40 may directly drive the output shaft 12 through gear 37.

As the operator begins movement of the control handle 24 toward the first maximum displacement position 25, hydraulic unit 20 acts as a pump supplying fluid to, and driving unit 21 as a motor in the same direction of rotation. Motor 21 drives the output shaft 12 through shaft 39, gear 40, gear 37, clutch 17, and carrier 45 which is locked with respect to the output shaft 12 in this mode. The transmission will stay in this low speed straight hydrostatic mode until the control handle 24 reaches a position just short of the maximum displacement position 25. In the straight hydrostatic mode, the output speed of shaft 12 is proportional to the displacement of hydraulic unit 20 and the speed of the fixed displacement unit 21 as shown in FIG. 3.

If the operator desires a continued increase in speed, he will push the control handle 24 to depress plunger 56 and switch 55, thereby energizing solenoid 58 and de-energizing solenoid 59. This will engage clutch 16 connecting input shaft 11 to power shaft 47 and disengage clutch 17 freeing the differential 14. As noted above, at this time, the power shaft 47 is rotating at the same speed and in the same direction as input shaft 11 so that the engagement of clutch 16 is effected inherently at synchronous speeds of the clutch elements, providing a smooth shift from the straight hydrostatic mode to the split differential mode. The operator then reduces the displacement of hydraulic unit 20 which begins to act as a motor or a metering device for the fixed displacement unit 21 which then operates as a pump driven by gears 37 and 40.

With clutch 16 engaged and clutch 17 disengaged, the carrier 45 and the ring gear 41 rotate in the same direction so that the ring gear effectively subtracts speed. As the displacement of the unit 20 is further reduced toward neutral, it provides a greater restriction to flow, and the speed of hydraulic unit 21 and ring gear 41 will decrease, thereby subtracting increasingly less and less speed from the differential and permitting the output speed of the shaft 12 to increase further. As shown in FIG. 3, during this mode, the speed of the unit 21 and the stroke of unit 20 decrease toward zero.

When the control handle 24 and swashplate 23 reach the neutral position, the fixed displacement unit 21 will cease rotation, inasmuch as the unit 20 is at zero displacement, thereby stopping rotation of ring gear 41. Continued movement of the control handle 24 toward the maximum reverse displacement position 26 causes unit 20 to again act as a pump, driving unit 21 in a reverse direction (see FIG. 3). This causes ring gear 41 in the differential to reverse its direction of rotation so that it begins rotation opposite from planet carrier 45, thereby adding speed to the differential and further increasing the speed of output shaft 12. The speed of the transmission can be increased in this mode until the maximum speed is obtained when the displacement of unit 20 is in its maximum negative position 26.

It should be noted that in bringing the output shaft 12 up to speed in the present transmission that the hydraulic unit 21 is effectively used three times as it goes through its speed range three times while the associated output shaft goes through its speed range once.

The speed of the transmission may thereafter be decreased by reducing the displacement of unit 20 from its maximum negative position 26 to neutral and again increasing its displacement to position 25, on the other side of neutral. This merely reverses the upper or split mode operation described above. A further reduction in speed is effected by the depression of switch 56 by the control handle 24, thereby disengaging clutch 16 and engaging clutch 17. This shift is again effected smoothly when the clutch elements inherently are rotating synchronously, and places the transmission again in the straight hydrostatic mode. A further reduction in speed is effected by movement of the control handle 24 back toward neutral.

The reverse drive of the transmission is effected simply by movement of the control handle 24 toward the maximum reverse displacement position in the straight hydrostatic mode. This permits about 20% of the maximum transmission speed to be obtained in reverse by moving the handle 24 to position 26. No reversing gears or clutch actuations are necessary to place the transmission in reverse as it operates in the straight hydrostatic mode in the same manner as in the low speed forward hydrostatic mode.

It should be understood that the control system for clutches 16 and 17 and for the variable displacement unit as herein described is merely exemplary and that other more sophisticated controls may be employed for the same purpose in an actual construction.

Further, it should be understood that the illustration of electrically operable clutches for effecting shifts is merely exemplary and that if desired, other forms of clutches may be employed such as, for example, hydraulically controlled and actuated clutches.

I claim:

1. A hydrostatic transmission having selective power paths, comprising: first shaft means, second shaft means, a differential including a first gear, a second gear and a control gear for varying the speed of rotation of the first gear with respect to the second gear, said second gear being drivingly connected to said second shaft means, a first hydraulic unit drivingly connected to one of said shaft means, a second hydraulic unit, conduit means interconnecting said first and second hydraulic units, means for varying the displacement of at least one of the hydraulic units, means for selectively connecting said hydraulic units to transfer all of the power between said first and second shaft means in a low speed range including a first clutch for locking said first gear, said second gear and said control gear together for rotation as a unit, means for transferring power in an upper speed range between said first and second shaft means including a selectively operable second clutch for drivingly connecting said first gear to said first shaft means, and control means for engaging said second clutch and disengaging said first clutch when the input shaft and the first gear are rotating at substantially the same speed whereby power flow in the upper speed range between the first and second shaft means is provided differentially.

2. A hydrostatic transmission having selective power paths, comprising: an input shaft, an output shaft, a differential including a first gear, a second gear, and a control gear for varying the speed of the second gear with respect to the first gear, said second gear being connected to drive said output shaft, a first hydraulic unit drivingly connected to said input shaft, a second hydraulic unit drivingly connected to said control gear, conduit means interconnecting said first and second hydraulic units, means for varying the displacement of one of the hydraulic units in two directions from neutral to control the torque on and the direction of rotation of the control gear, means for selectively connecting the hydraulic units to transfer all of the power between said input shaft and said output shaft in a low speed range including a first clutch for locking said first gear, said second gear and said control gear together for rotation as a unit, and means for transferring power between said input shaft and said output shaft in an upper speed range including a second clutch selectively connecting said input shaft to said first gear, control means for engaging said second clutch and disengaging said first clutch when the input shaft and the first gear are rotating at substantially the same speed, said displacement varying means being movable toward a first displacement position on one side of neutral in the lower speed range and movable from said first displacement position toward neutral in a lower portion of the upper speed range, said hydraulic unit and control gear being arranged to subtract increasingly less speed from the differential in said lower portion of the upper speed range.

3. A hydrostatic transmission as defined in claim 2, wherein said displacement varying means is movable to the neutral position to lock said control gear, and movable from neutral toward a second displacement position on the other side of neutral to cause reverse rotation of the control gear for adding speed to the differential to further increase the speed of the output shaft.

4. A hydrostatic transmission having selective power paths, comprising: an input shaft, an output shaft, a differential including a first gear, a second gear, and a control gear for varying the speed of the second gear with respect to the first gear, said second gear being connected to drive said output shaft, a first hydraulic unit drivingly connected to said input shaft, a second hydraulic unit drivingly connected to said control gear, conduit means interconnecting said first and second hydraulic units, means for varying the displacement of one of the hydraulic units in two directions from neutral to control the torque on and the direction of rotation of the control gear, means for transferring power in a low speed range between said input and output shafts including means for selectively connecting the hydraulic units to transfer all of the power between said input shaft and said output shaft, and means for transferring power between said input shaft and said output shaft in an upper speed range including means for selectively connecting said input shaft to said first gear, said displacement varying means being movable toward a first displacement position on one side of neutral in the lower speed range and movable from said first displacement position toward neutral in a lower portion of the upper speed range, said hydraulic unit and control gear being arranged to subtract increasingly less speed from the differential in said lower portion of the upper speed range, said means for selectively connecting said input shaft to said first gear including a first clutch operable at the first displacement position of the displacement varying means to drivingly connect said input shaft to said first gear, said means for connecting the hydraulic units to transfer all of the power including a second clutch normally connecting the control gear to said second gear for rotation as a unit, said second clutch being operable at the first displacement position of said displacement varying means to release the connection between the control gear and the second gear, said differential and hydraulic units being constructed to rotate the first gear synchronously with the input shaft at the first displacement position.

5. A hydrostatic transmission as defined in claim 4 and further including control means for selectively operating said clutches, said control means being responsive to movement of the displacement varying means to said first position in the lower speed range to engage said first clutch and disengage the second clutch to place transmission in an upper speed range mode, said displacement varying means being movable past neutral toward a second displacement position on the other side of neutral in an upper portion of the upper speed range to add speed to the differential by reversely rotating said control gear.

6. A hydrostatic transmission as defined in claim 1, wherein said control gear includes a ring gear, said first gear includes a carrier having planetary gearing in engagement with said ring gear and said second gear includes a sun gear in engagement with said planetary gearing, said displacement varying means being movable to a first position where said input shaft and said carrier rotate synchronously, said control means being responsive to the positioning of the displacement varying means at said first displacement position for engaging said first clutch and disengaging said second clutch to place the transmission in the upper speed range as the transmission is brought up to speed, said control means being responsive to movement of the displacement varying means to said first position for disengaging said first clutch and engaging said second clutch to place the transmission in the lower speed range as the transmission speed is reduced.

References Cited

UNITED STATES PATENTS

| | | | |
|---|---|---|---|
| 3,122,025 | 2/1964 | Mark et al. | 74—687 X |
| 3,238,816 | 3/1966 | Schottler | 74—690 |
| 3,251,243 | 5/1966 | Kress | 74—689 |
| 3,306,129 | 2/1967 | D'Alelio | 74—687 |
| 1,951,345 | 3/1934 | Centervall | 74—687 |
| 2,485,126 | 10/1949 | Wood | 74—687 X |
| 2,817,250 | 12/1957 | Forster | 74—687 |
| 2,869,397 | 1/1959 | Weaving et al. | 74—687 |
| 2,931,250 | 4/1960 | Ebert | 74—687 |
| 2,939,342 | 6/1960 | Woydt et al. | 74—687 |

FRED C. MATTERN, JR., Primary Examiner.

ARTHUR T. McKEON, Assistant Examiner.